United States Patent
Tamura

(10) Patent No.: US 9,383,706 B2
(45) Date of Patent: Jul. 5, 2016

(54) APPARATUS, IMAGE PROCESSING APPARATUS, METHOD, AND STORAGE MEDIUM ACQUIRING TONE LEVEL CORRECTION DATA, AND ADJUSTING THE ACQUIRED TONE LEVEL CORRECTION DATA

(71) Applicant: CANON KABUSHIKI KAISHA, Tokyo (JP)

(72) Inventor: Hirokazu Tamura, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/643,045

(22) Filed: Mar. 10, 2015

(65) Prior Publication Data

US 2015/0261164 A1 Sep. 17, 2015

(30) Foreign Application Priority Data

Mar. 13, 2014 (JP) .................................. 2014-050306

(51) Int. Cl.
| | | |
|---|---|---|
| *G06K 15/02* | (2006.01) | |
| *G03G 15/00* | (2006.01) | |
| *H04N 1/60* | (2006.01) | |
| *B41J 29/393* | (2006.01) | |

(52) U.S. Cl.
CPC .............. *G03G 15/55* (2013.01); *B41J 29/393* (2013.01); *H04N 1/6027* (2013.01); *H04N 1/6033* (2013.01)

(58) Field of Classification Search
None
See application file for complete search history.

(56) References Cited

U.S. PATENT DOCUMENTS

| | | | |
|---|---|---|---|
| 5,132,788 A * | 7/1992 | Hirota ................... | H04N 1/401 358/517 |
| 5,384,900 A | 1/1995 | Sato et al. | |
| 5,642,124 A | 6/1997 | Kawai et al. | |
| 6,263,100 B1 | 7/2001 | Oshino et al. | |
| 6,628,820 B2 | 9/2003 | Oshino et al. | |
| 6,721,062 B1 | 4/2004 | Sawada et al. | |
| 7,130,550 B2 * | 10/2006 | Mochizuki ......... | G03G 15/0131 399/44 |
| 7,421,217 B2 * | 9/2008 | Sugita .................. | G03G 15/553 399/27 |
| 8,379,274 B2 | 2/2013 | Tamura | |
| 8,384,960 B2 * | 2/2013 | Tanaka ............... | H04N 1/00002 358/3.21 |
| 8,432,579 B2 * | 4/2013 | Itagaki .................. | B41J 29/393 358/1.9 |
| 8,593,694 B2 | 11/2013 | Tamura | |

(Continued)

FOREIGN PATENT DOCUMENTS

JP         2001-094784         4/2001

OTHER PUBLICATIONS

European Search Report issued in counterpart European Patent Application No. 15000685.6 mailed Jul. 20, 2015.

*Primary Examiner* — Steven Kau
(74) *Attorney, Agent, or Firm* — Fitzpatrick, Cella, Harper & Scinto

(57) ABSTRACT

An apparatus according to the present invention includes: an acquisition unit configured to acquire, based on the results of reading a test pattern output by a printing unit, tone level correction data for bringing the reproduction characteristics of an image that is output by the printing unit close to a target value; a unit configured to generate adjusted tone level correction data obtained by adjusting the tone level correction data so that a predetermined density area increases in density; and a unit configured to generate color material amount correction data adjusted so that the amount of color material that is used for image formation becomes small in accordance with the degree of the adjustment in the adjusted tone level correction data.

17 Claims, 10 Drawing Sheets

(56) References Cited

U.S. PATENT DOCUMENTS

| | | | |
|---|---|---|---|
| 8,843,003 B2* | 9/2014 | Nakao | G03G 15/234 399/15 |
| 2005/0190216 A1 | 9/2005 | Yamazaki et al. | |
| 2010/0053708 A1 | 3/2010 | Igarashi | |
| 2012/0086987 A1* | 4/2012 | Tamura | G03G 15/0141 358/3.24 |

* cited by examiner

APPARATUS, IMAGE PROCESSING APPARATUS, METHOD, AND STORAGE MEDIUM ACQUIRING TONE LEVEL CORRECTION DATA, AND ADJUSTING THE ACQUIRED TONE LEVEL CORRECTION DATA

BACKGROUND OF THE INVENTION

1. Field of the Invention

The present invention relates to a technique to stabilize gradation properties in an electrophotographic image forming apparatus.

2. Description of the Related Art

As an image printing system that is used in the image forming apparatus, such as a printer and a copying machine, the electrophotographic system and the ink jet system are known. The electrophotographic system is a system in which a latent image is formed on a photosensitive drum by using laser beams and development is performed by using charged color material (hereinafter, toner), and printing of an image is performed by transferring the developed toner image onto a transfer sheet and fixing the image. The ink jet system is a system in which ink is ejected from a plurality of eject ports by a heating body or a piezoelectric element and printing is performed by attaching ink to a printing medium such as paper.

In the case where, for example, the electrophotographic system is used for a printing unit, the electrophotographic processes, such as laser exposure, latent image formation on a photoreceptor, toner development, toner transfer onto a paper medium, and fixing by heat, are likely to be affected by the temperature and humidity around the apparatus, changes with the passage of time, etc. Because of this, the amount of toner that is ultimately fixed on a printing sheet changes each time printing is performed. It is known that such instability is not inherent only in the electrophotographic system, but occurs similarly in other various systems, such as the ink jet system and the thermal transfer system.

As a method of solving such trouble, there is a method in which a test pattern image is output from the image forming apparatus and the density thereof is measured, and then, a lookup table (LUT) is created from the results of the measurement and the characteristics of the printing unit are corrected.

In the correction using the LUT, in order to achieve the gradation properties that are aimed at, the maximum density, which is a target in the apparatus, is set in advance and correction is performed so that the gradation properties appear smoothly until the set maximum density is reached. However, depending on the condition of the apparatus, there is a case where a density that exceeds the set maximum density is produced, and therefore, in such a case, an excessive amount is suppressed by the LUT. At this time, due to the suppression of the upper limit value of the density, a problem of jaggies, discontinuity, etc., may occur in the portions, such as a character at the maximum density and a thin line. For this problem, a method has been proposed that solves the problem by causing a user to select the LUT for which the so-called terminal correction is performed to forcedly modify the upper limit value to the maximum value so as to guarantee that the input at the maximum density is output at the maximum density (see Japanese Patent Laid-Open No. 2001-094784).

On the other hand, for example, in the case where the maximum density that is targeted is 1.5, while an image at a density of 1.6 is output in a certain environment, the amount of color material exceeds the upper limit value as a result. In the case where the amount of color material per unit area exceeds a certain amount, which is the upper limit, as described above, another problem resulting from poor fixing of the color material may occur. Specifically, problems may occur, such as toner scattering in the case of the electrophotographic system, blurring of ink, mixing with another color, show-through at the time of printing of a plurality of pages, etc., in the case of the ink jet system. In particular, toner scattering may not only result in an image of poor quality, but also may result in damage to the apparatus main body. In order to avoid those problems, in the case where an image is formed, control is performed so that the total amount of color material per unit area is without fail lower than a fixed amount determined in advance. Then, for example, in the case of the electrophotographic color printer, a method is adopted in which the total amount per unit area is reduced by changing the combination of toner in four colors, i.e., cyan, magenta, yellow, and black while avoiding excessive restrictions. Specifically, it is common to adopt a method of suppressing the change in color tone and deterioration in the gradation properties to a minimum by increasing the amount of black instead of reducing the amount of cyan, magenta, and yellow by the same amount.

As described above, in the case where an output whose density exceeds the set maximum density is produced in order to reduce jaggies in the circumstances in which the limit value of the amount of color material per unit area is determined, there occurs another problem of poor fixing of the color material. In other words, jaggies and discontinuity in a line due to the suppression of the density upper limit value, and toner scattering and ink blurring due to an increase in the density by more than a supposed value are in the relationship of trade-off, but the method disclosed in Japanese Patent Laid-Open No. 2001-094784 does not take into consideration the balance between both of these concerns.

An object of the present invention is to appropriately control the tone level in accordance with the state of an image forming apparatus by taking into consideration the balance of the relationship of the trade-offs as described above.

SUMMARY OF THE INVENTION

The apparatus according to the present invention includes: an acquisition unit configured to acquire, based on the results of reading a test pattern output by a printing unit, tone level correction data for bringing the reproduction characteristics of an image output by the printing unit close to a target value; a unit configured to generate adjusted tone level correction data obtained by adjusting the tone level correction data so that a predetermined density area increases in density in the case where a maximum density value of an image, the value of which is derived based on the tone level correction data acquired by the acquisition unit and which is output by the printing unit, exceeds a target maximum density value of the printing unit; and a unit configured to generate color material amount correction data adjusted so that the amount of color material that is used for image formation becomes small in accordance with a degree of the adjustment in the adjusted tone level correction data.

According to the present invention, it is possible to implement the stable color reproduction and tone level while eliminating the instability of the output density.

Further features of the present invention will become apparent from the following description of exemplary embodiments (with reference to the attached drawings).

DESCRIPTION OF THE EMBODIMENTS

Hereinafter, with reference to the attached drawings, the present invention is explained in detail in accordance with preferred embodiments. Configurations shown in the following embodiments are just an example and the present invention is not limited to the configurations shown schematically.

First Embodiment

Figure 1:
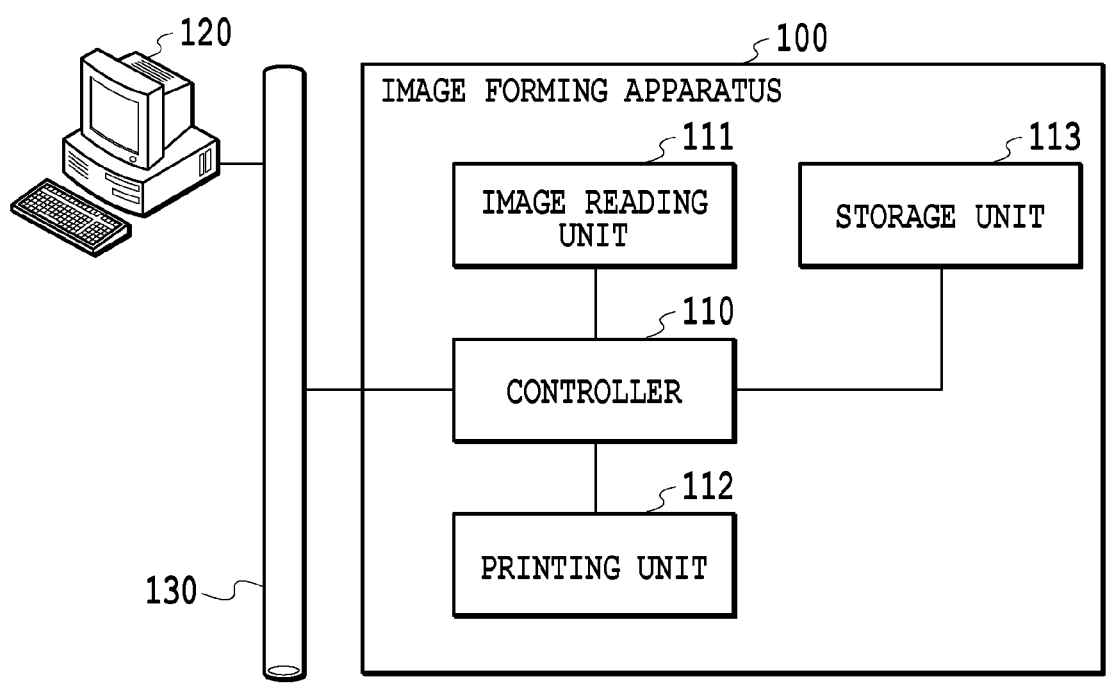
FIG. 1 a block diagram showing a configuration example of a printing system.

FIG. 1 is a block diagram showing a configuration example of a printing system including an electrophotographic image forming apparatus according to the present embodiment.

An image forming apparatus 100 is connected with a PC 120 as an information processing apparatus that gives various instructions such as instructions to perform printing via a network 130 such as a LAN (Local Area Network). Then, the image forming apparatus 100 includes a controller 110, an image reading unit 111, a printing unit 112, and a storage unit 113. Hereinafter, each unit of the image forming apparatus 100 is explained.

The controller 110 includes hardware, such as a CPU, a RAM, and a ROM, and controls the whole of the image forming apparatus 100 by various control programs and image processing programs stored in the ROM. For example, the controller 110 converts print data including image data that is input from the image reading unit 111 or from the outside into intermediate data, performs image correction such as density correction for the converted intermediate data, and stores the intermediate data in an object buffer of the storage unit 113. Further, the controller 110 generates bitmap data based on the stored intermediate data and after performing color space conversion processing, gamma correction processing, halftone processing, and PWM control processing, gives instructions to perform printing to the printing unit 112. Details of the image processing in the controller 110 will be described later.

The image reading unit 111 reads an image on a document set on a document table etc., not shown, by scanning the document and acquires image data.

The printing unit 112 forms and outputs a color image on a printing medium such as paper.

The storage unit 113 includes a RAM, a hard disk (HD), etc. The RAM is used mainly as a reference area where data is referred to and a work area of data. The HD is used to save image data acquired by the image reading unit 111.

Although not shown explicitly in FIG. 1, the image forming apparatus 100 also includes other configurations, such as a display unit configured to display various kinds of information and an operation unit configured to receive instructions to perform operations from a user. In the present embodiment, an explanation is given by taking the case as an example where the image printing system of the image forming apparatus is the electrophotographic system, but it is also possible to apply the present invention to other image printing systems having the same problems, such as the ink jet system.

Figure 2:
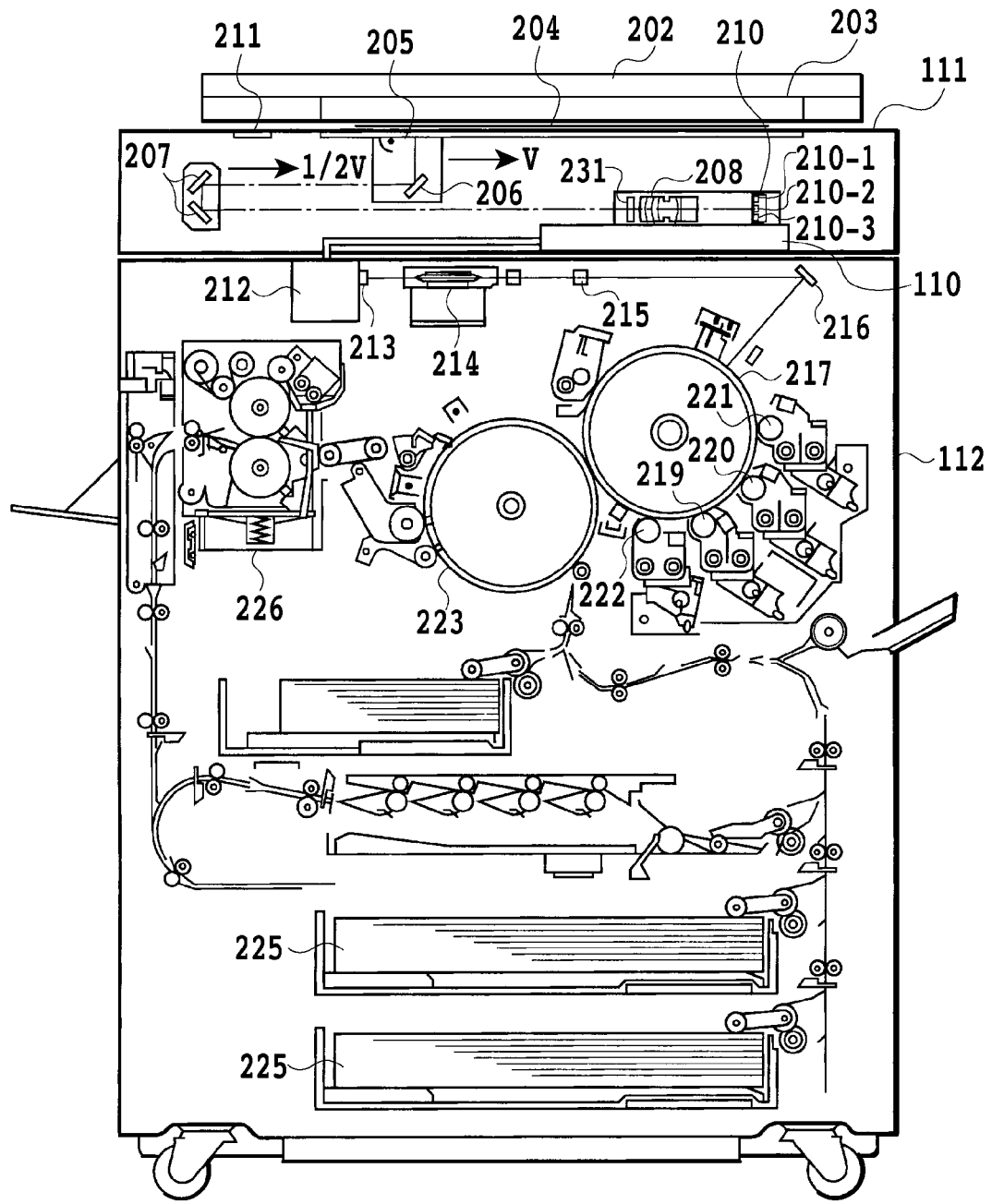
FIG. 2 is a diagram showing an internal configuration of an electrophotographic image forming apparatus.

FIG. 2 is a diagram showing an internal configuration of the electrophotographic image forming apparatus 100 according to the present embodiment.

In the case where a document 204 is placed between a document table glass 203 and a document pressure plate 202 in the image reading unit 111 and instructions to read the document 204 are given, the document 204 is irradiated with light of a lamp 205. The reflected light from the document 204 is guided to mirrors 206 and 207 and an image is formed on a three-line sensor 210 by a lens 208. The lens 208 is provided with an infrared cut filter 231. By a motor, not shown, a mirror unit including the mirror 206 and the lamp 205 is moved at a speed of V and a mirror unit including the mirror 207 is moved at a speed of V/2 in the direction of an arrow. In other words, the mirror unit moves in the vertical direction (sub scan direction) with respect to the electrical scan direction (main scan direction) of the three-line sensor 210 and the entire surface of the document 204 is scanned.

The three-line sensor 210 including CCDs in three lines performs color separation of input light information, reads each color component, i.e., red (R), green (G), and blue (B), and transmits color component signals to a signal processing unit 209. It is assumed that each CCD constituting the three-line sensor 210 has a light receiving element corresponding to 5,000 pixels and is capable of reading a document having the A3 size, which is the maximum size of a document that can be placed on the document table glass 203, in the width direction (297 mm) with a resolution of 600 dpi.

A standard white plate 211 is for correcting data read by each of CCDs 210-1 to 210-3 of the three-line sensor 210. The standard white plate 211 is white that exhibits substantially uniform reflection characteristics in visible light.

The controller 110 performs electrical processing on an image signal that is input from the three-line sensor 210 to generate an image signal including each of color components of cyan (C), magenta (M), yellow (Y), and black (K), and sends the generated image signal to the printing unit 112. The image represented by the image signal is a CMYK image on which halftone processing such as dither has been performed.

The printing unit 112 sends the CMYK image signal that is sent from the image reading unit 111 to a laser driver 212. The laser driver 212 drives a semiconductor laser element 213 by performing modulation in accordance with the input image signal.

For the modulation control of a laser element, for example, the PWM (Pulse Width Modulation) is used, and the intensity of a dot constituting a pixel is adjusted by turning on/off the amount of laser light in a time-division manner. By this, it is made possible to form, for example, a pixel whose density is half the density of a pixel that is formed by the full lighting time by setting the lighting time to 8/16 of the full lighting time. The amount of control is determined by the time-division performance of the PWM and in the present embodiment, it is assumed that one pixel can be controlled by the lighting time, i.e., the amount of light, in 16 steps from 0 corresponding to no lighting to 15. In the present embodiment, an example is explained in which the PWM is used exclusively for the control of the amount of light, but the method of controlling the lighting time of laser, i.e., the amount of light, is not limited to the PWM and another method, for example, the PM (Power Modulation) may be used.

The laser beam that is output from the semiconductor laser element 213 scans a photosensitive drum 217 via a polygon mirror 214, an f-θ lens 215, and a mirror 216 and forms an electrostatic latent image on the photosensitive drum 217.

The developer unit includes a magenta developer unit 219, a cyan developer unit 220, a yellow developer unit 221, and a black developer unit 222. By the four developer units alternately coming into contact with the photosensitive drum 217, the electrostatic latent images that are formed on the photosensitive drum 217 are developed by the toner in corresponding colors and thus toner images are formed. A printing sheet fed from a printing sheet cassette 225 is wound around a transfer drum 223 and the tone images on the photosensitive drum 217 are transferred to the printing sheet.

The printing sheet onto which the toner images in the four colors of CMYK have been transferred in order in this manner passes through a fixing unit 226 in which the toner images are fixed, and is discharged to the outside of the apparatus.

Figure 3:
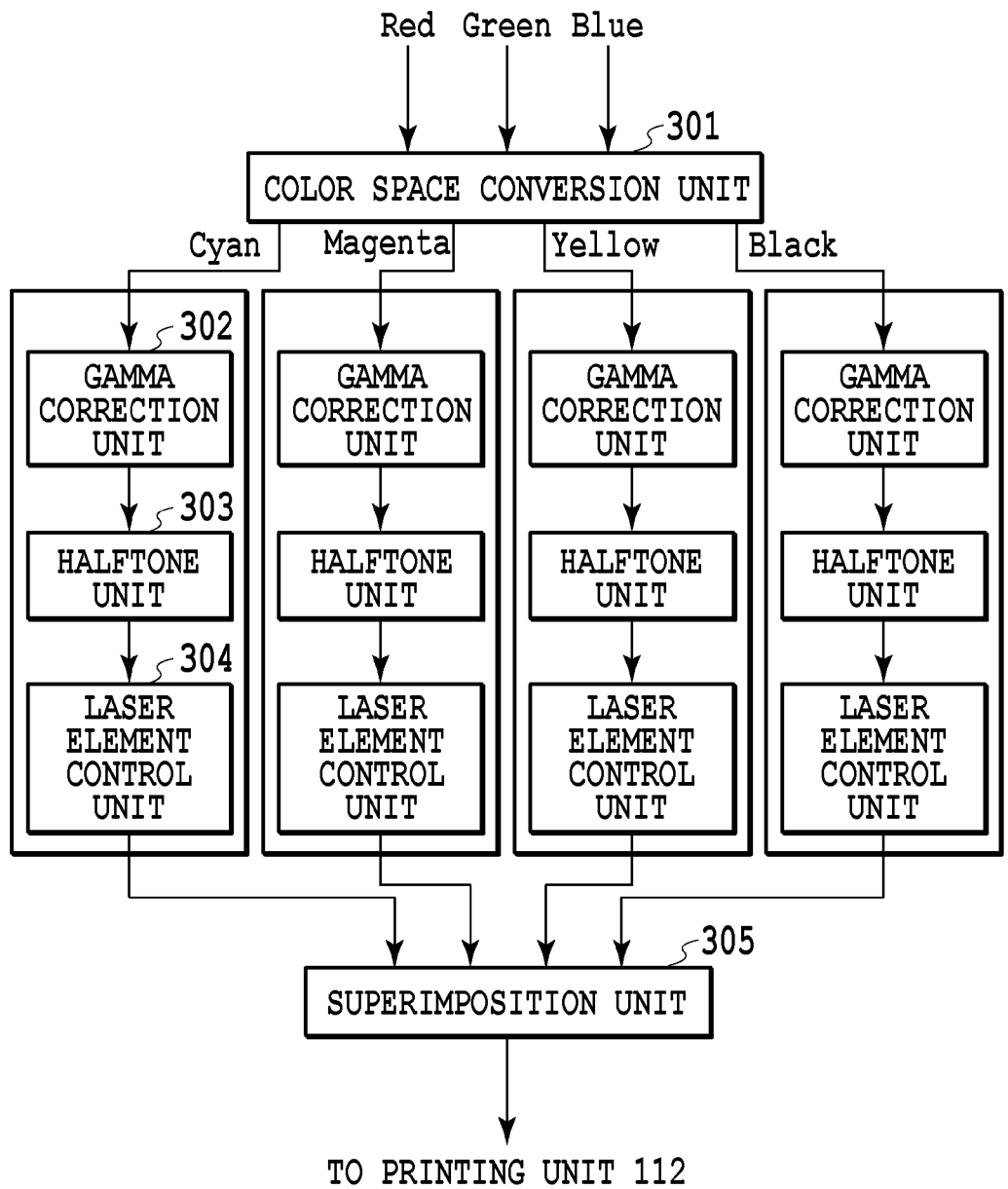
FIG. 3 is a diagram explaining an outline of a flow according to a first embodiment until a CMYK image signal that is used in a printing unit is generated.

Next, the image processing that is performed in the controller 110 according to the present embodiment is explained in detail. By the CPU executing the above-described image processing programs, the processing, such as color space conversion processing, gamma correction processing, halftone processing, and PWM processing (color material amount control processing), to be described below, is implemented. FIG. 3 is a diagram explaining an outline of a flow according to the present embodiment until a CMYK image signal that is used in the printing unit 112 is generated after the predetermined image processing is performed on an input RGB image signal.

The multivalued image data represented by RGB that is input from the PC 120 etc. or acquired by the image reading unit 111 is first sent to a color space conversion unit 301. In the following, explanation is given on the assumption that the signal is an 8-bit signal whose maximum value of the multivalued data is 255, but as a matter of course, explanation is not limited to this.

The received multivalued image data is represented in the color space of RGB, and therefore, the color space conversion unit 301 converts the image data into data in the CMYK color space that is the color space dependent on a printer device. The color space conversion processing is performed by using a three-dimensional LUT (Look Up Table) that is set so that each of the CMYK values after the conversion has a linear relationship with respect to each density of the toner. In other words, the LUT is set so that in the case where the output is 0, the density is 0, in the case where the output is 255, the density is the maximum density targeted at by the printer, and in the case where the output is 128, the density is half the maximum density on the assumption that the image data after the conversion that is output is 8-bit multivalued image data. The LUT is a table in which input data divided at specific intervals and output data corresponding to the input data are stored and it is possible for the LUT to represent nonlinear characteristics that cannot be expressed by an arithmetic expression. The multivalued image data converted into each color space of CMYK is sent to a gamma correction unit 302 in accordance with each color of CMYK.

The gamma correction unit 302 performs gamma correction processing (tone level correction processing) on the received multivalued CMYK image data in order to eliminate nonlinearity of the tone level of each color dependent on the printer device and to correct each color to the target tone level. The gamma correction processing is performed by using a one-dimensional LUT as tone level correction data. The method of creating the LUT will be described later. The image data (8-bit multivalued data) on which the gamma correction processing has been performed is sent to a halftone unit 303.

Figure 4A:
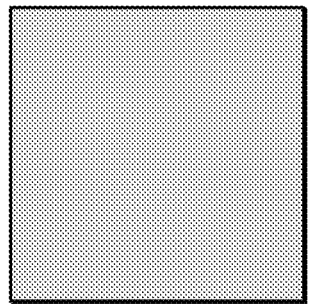
FIGS. 4Aa to 4Da and 4Ab to 4Db are diagrams showing examples of multivalued images and halftone images obtained by halftone processing.
Figure 4A:
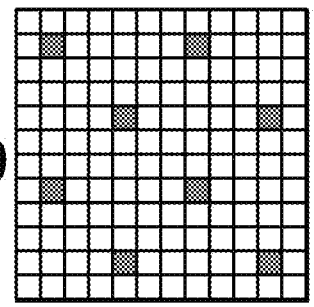
Figure 4B:
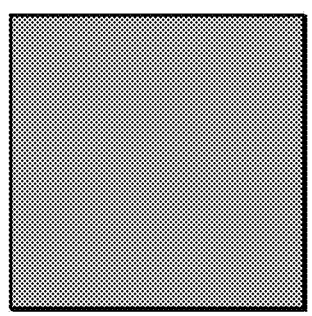
Figure 4B:
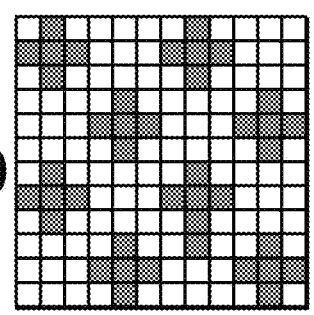
Figure 4C:
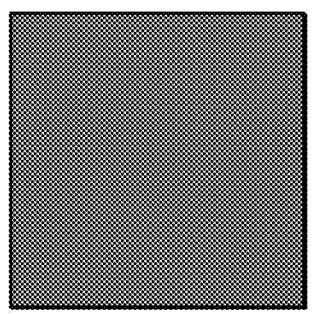
Figure 4C:
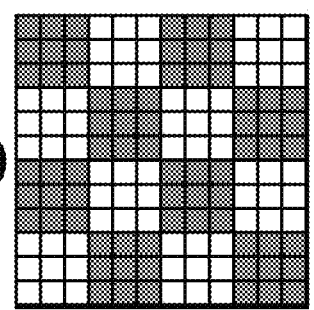
Figure 4D:
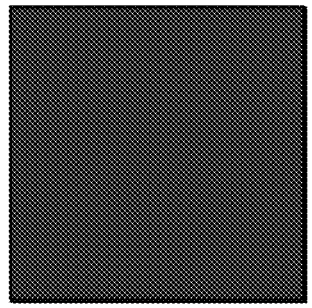
Figure 4D:
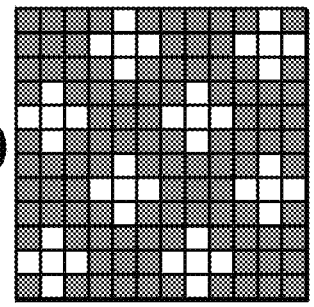

The halftone unit 303 generates binary image data (halftone image data) by performing halftone processing on the multivalued image data after the gamma correction processing. The halftone processing is performed by the publicly-known method, such as the dither method and the error diffusion method. FIGS. 4Aa to 4Da and 4Ab to 4Db are diagrams each showing an example of the halftone image that is obtained by the halftone processing. FIGS. 4Aa to 4Da show multivalued images whose densities differ stepwise, and FIGS. 4Ab to 4Db show halftone images after binarization corresponding to the multivalued images, respectively. Because the multivalued image is reproduced by a pseudo tone level by the halftone processing, there is a case where a dot loss occurs unless the value of the multivalued image is the maximum value (255 in the case of 8-bit data), and jaggies or a broken line is output depending on the image that is input. The output of an area in which the pixel value of the image is the maximum value (hereinafter, a solid black area) is the output at the maximum density that does not cause jaggies or discontinuity. The meaning of the two values in binary image data is defined as follows. In the case of 0, no dot is printed (white) and in the case of 1, a dot is printed (color). The binary image data after the halftone processing is sent to a laser element control unit 304. The image data after the halftone processing is not limited to binary image data and may be, for example, four-valued image data.

The laser element control unit 304 performs the PWM control processing described above on the binary image data after the halftone processing. This processing can also be referred to as processing (color material amount control processing) to control the amount of toner that is attached to an electrostatic latent image by controlling the amount of light of the laser element at the time of the formation of the electrostatic latent image. In the case where it is assumed that the resolution of the PWM used for the modulation of the laser element is 16 tone levels, conversion into 4-bit data having a value of 0 to 15 for each pixel is performed. Specifically, 4-bit data is generated by multiplying the binary image data after the halftone processing by the value converted from the multivalued data after the gamma processing by using the one-dimensional LUT. For example, in the case where the value (of multiple values) of the pixel of interest after the gamma correction is 200 and the value (of two values) after the halftone processing is 1, the value (1) after the halftone processing is multiplied by the value (e.g., 14) obtained by the LUT conversion from the value (200) of the multiple values, and therefore, 14 is obtained as an output value. The LUT that is used at this time is generated in association with the LUT that is used for the gamma correction described previously. Details of the generation method will be described later. The image data after the PWM control processing is sent to a superimposition unit 305.

The superimposition unit 305 performs processing to superimpose images obtained for each of CMYK. Then, the image data on which the superimposition processing has been performed is sent to the printing unit 112 and is output as a full color image in the printing unit 112.

Next, the method of creating/updating a one-dimensional LUT for gamma correction is explained.

As described above, due to the influence of the temperature and humidity around the image forming apparatus, the changes in constituent parts due to the passage of time, etc., the toner density (toner amount) on a sheet changes. The gamma correction processing described previously is performed in order to eliminate the instability, but in order to keep the gradation properties stable, it is not possible to continue to perform the processing by using the initial value as it is of the gamma correction value, and it is necessary to update the gamma correction value by following the changes due to the environment (calibration).

Figure 5:
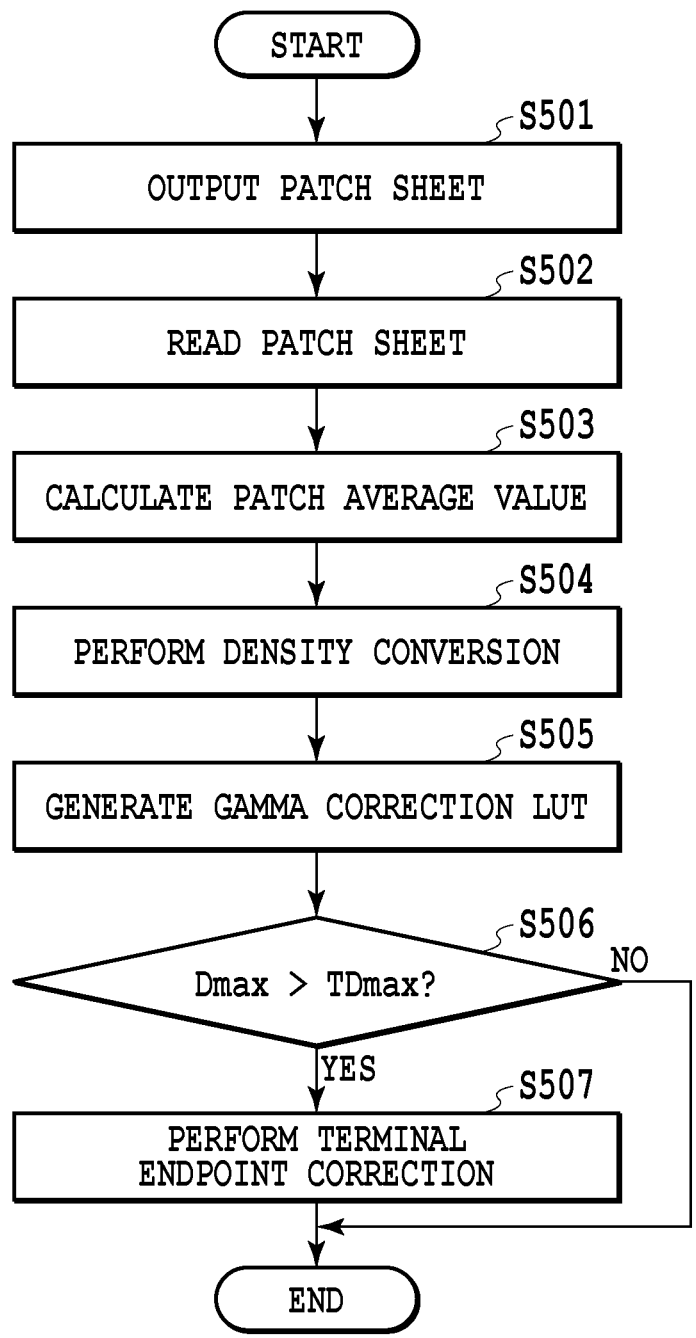
FIG. 5 is a flowchart showing a flow of updating processing of a one-dimensional LUT for gamma correction.

FIG. 5 is a flowchart showing a flow of updating processing of a one-dimensional LUT for gamma correction. The series of processing is performed by the CPU reading computer executable programs in which the procedures shown below are described from the ROM onto the RAM and executing the programs.

Figure 6:
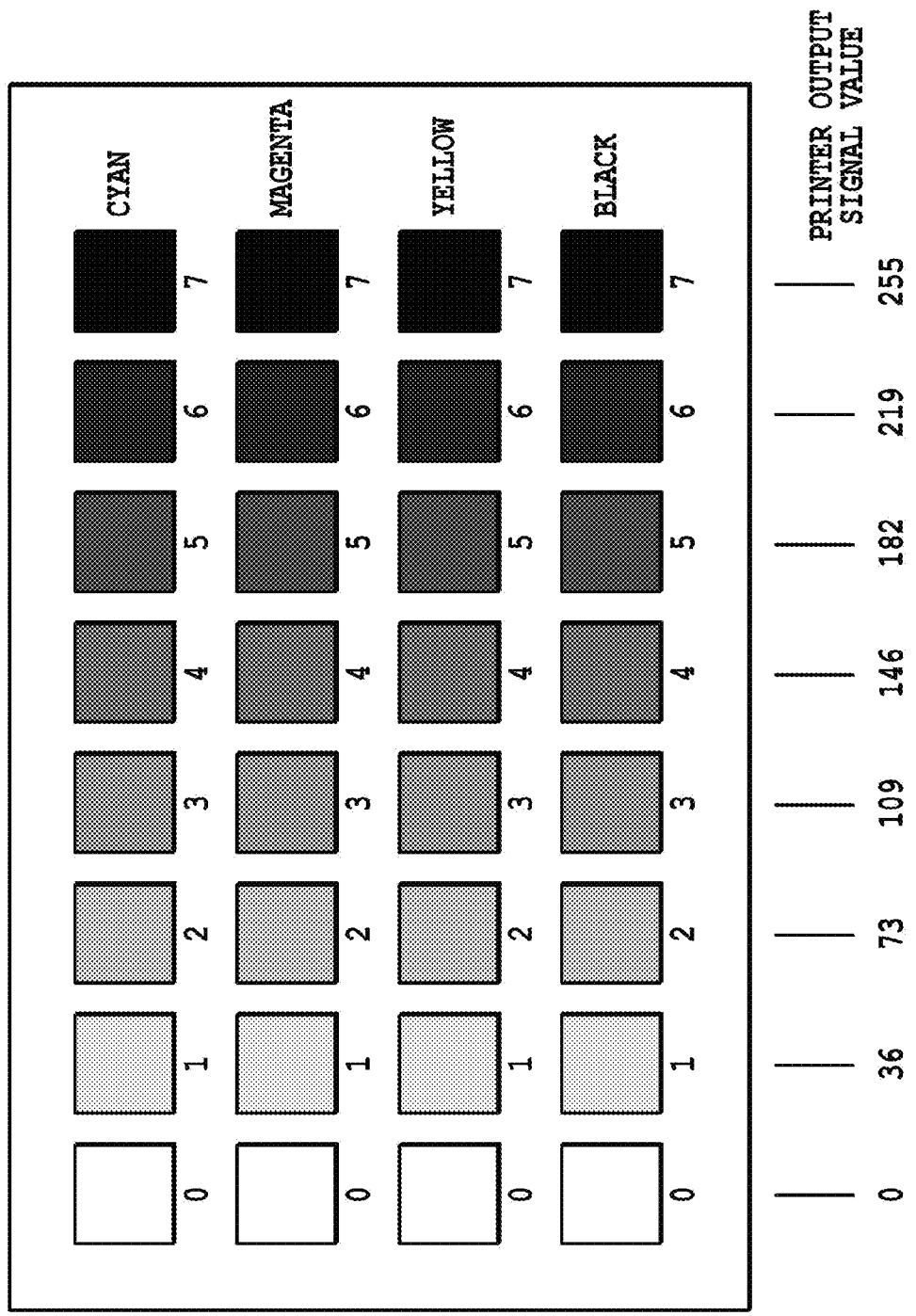
FIG. 6 is a diagram showing an example of a test pattern image.

At step 501, the CPU gives instructions to output a test pattern image to the printing unit 112. Upon receipt of the instructions, the printing unit 112 forms and outputs the test pattern image on a sheet etc. Specifically, the test pattern image is an image in which eight printed areas in the shape of a square representing the toner attachment ratio in eight steps (0% to 100%) are put side by side in order for each color of CMYK (in this case, 4×8=32 areas in total). FIG. 6 is a diagram showing an example of the test pattern image in which the toner attachment ratio is represented in eight steps for each of CMYK. The eight printed areas in the shape of a square representing the toner attachment ratio in eight steps for each of CMYK are called zeroth to seventh patches, respectively. As is obvious from FIG. 6, the patches are arranged at equal intervals so that the printer output signal value of the zeroth patch is "0", that of the first patch is "36, that of the second patch is "73", . . . , and that of the seventh patch is "255". At this step, the data of the test pattern image that is prepared in advance is read from the storage unit 113 and the test pattern image (binary) that is obtained by performing the halftone processing without performing the gamma correction processing is output without performing the PWM control. In other words, in the case of "0", "0" is output and in the case of "1", "15" is output, and thereby it is possible to grasp the current gradation properties of the printer.

At step 502, the CPU gives instructions to read the sheet (hereinafter, patch sheet) on which the test pattern image is printed to the reading unit 111. Upon receipt of the instructions, the reading unit 111 reads the patch sheet on a document table and acquires image data (RGB). At this time, the patch of C (cyan) is read as a signal of R, the patch of M (magenta) is read as a signal of G, and the patch of Y (yellow) is read as a signal of B. By reading the patch of each color by using a signal of the complementary color, it is made possible to acquire the gradation properties with a high accuracy from the high-density area to the highlight area.

At step 503, the CPU averages the read signal values corresponding to each patch with respect to the area of the patch and finds a representative read signal value of each path (patch average value).

At step 504, the CPU converts the patch average value obtained at step 503 into a density value. The read signal from the reading unit 111 is read as a signal linear to the reflectance, and therefore, the conversion into the density is usually the logarithmic conversion. For example, in the case where the input luminance is represented by an 8-bit luminance signal S, it is possible to convert the luminance signal S into a density D by using expression (1) below.

$$D = -255 * \log 10(S/255)/1.6 \qquad \text{expression}(1)$$

The above-described expression (1) is a conversion expression for normalizing the luminance signal S so that the density D=255 is obtained in the case where the document density is 1.6. In the case where the value that is found by the above-described expression (1) exceeds 255, the value is limited to 255 without exception. It may also be possible to perform density conversion by the calculation using the above-described expression (1) or by using a table in which the luminance is taken to be an input and the density is taken to be an output.

Figure 7:
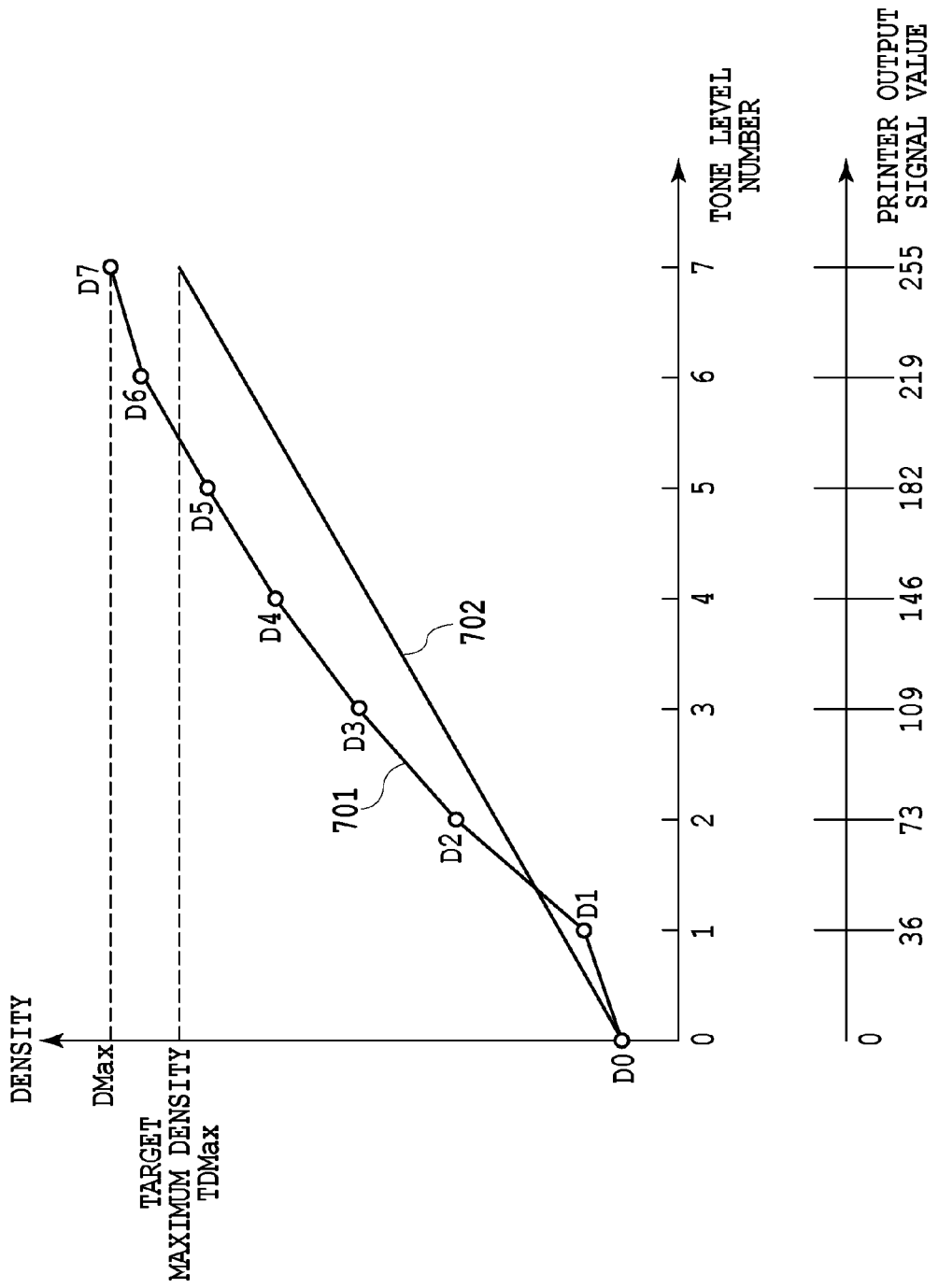
FIG. 7 is a diagram showing an example of a graph in which density values after conversion are plotted.

FIG. 7 is an example of a graph in which the density values after the conversion that are found as described above are plotted and the vertical axis represents the density and the horizontal axis represents the tone level. In the graph, ○ indicates the density value of each patch and the density values are plotted in such a manner that the density of the zeroth patch is plotted as D0, the density of the first patch is plotted as D1, and so on. A zigzag line 701 that connects D0 to D7 indicates the characteristics of the printing unit 112 and a straight line 702 indicates the target characteristics of the printing unit 112. From this graph, the density in the case where the printing unit 112 outputs solid black (in the case where the printer output signal value is 255) is specified as D7 and D7 is a maximum density value (Dmax) that the printing unit 112 can output. In the case where the image is printed with the densities of D6 and D7 left in this state, the scattering of toner described previously may occur because D6 and D7 exceed a target maximum density (TDmax). Because of this, at the next step 505, an LUT for correcting the characteristics (gamma correction LUT) is created.

At step 505, the CPU creates a gamma correction LUT having characteristics opposite to the characteristics obtained at step 504 (the characteristics shown by the segment 701). By correcting and outputting the CMYK values, which are input values, by using the LUT having the opposite characteristics, it is made possible to obtain the target gradation properties. The target shown by the above-described segment 702 is a fixed target that is supposed in advance by the printing unit 112 (printer engine), and by performing correction toward the target, the same tone level state is guaranteed for a printer whose color tone and gradation properties have changed with the passage of time.

Figure 8:
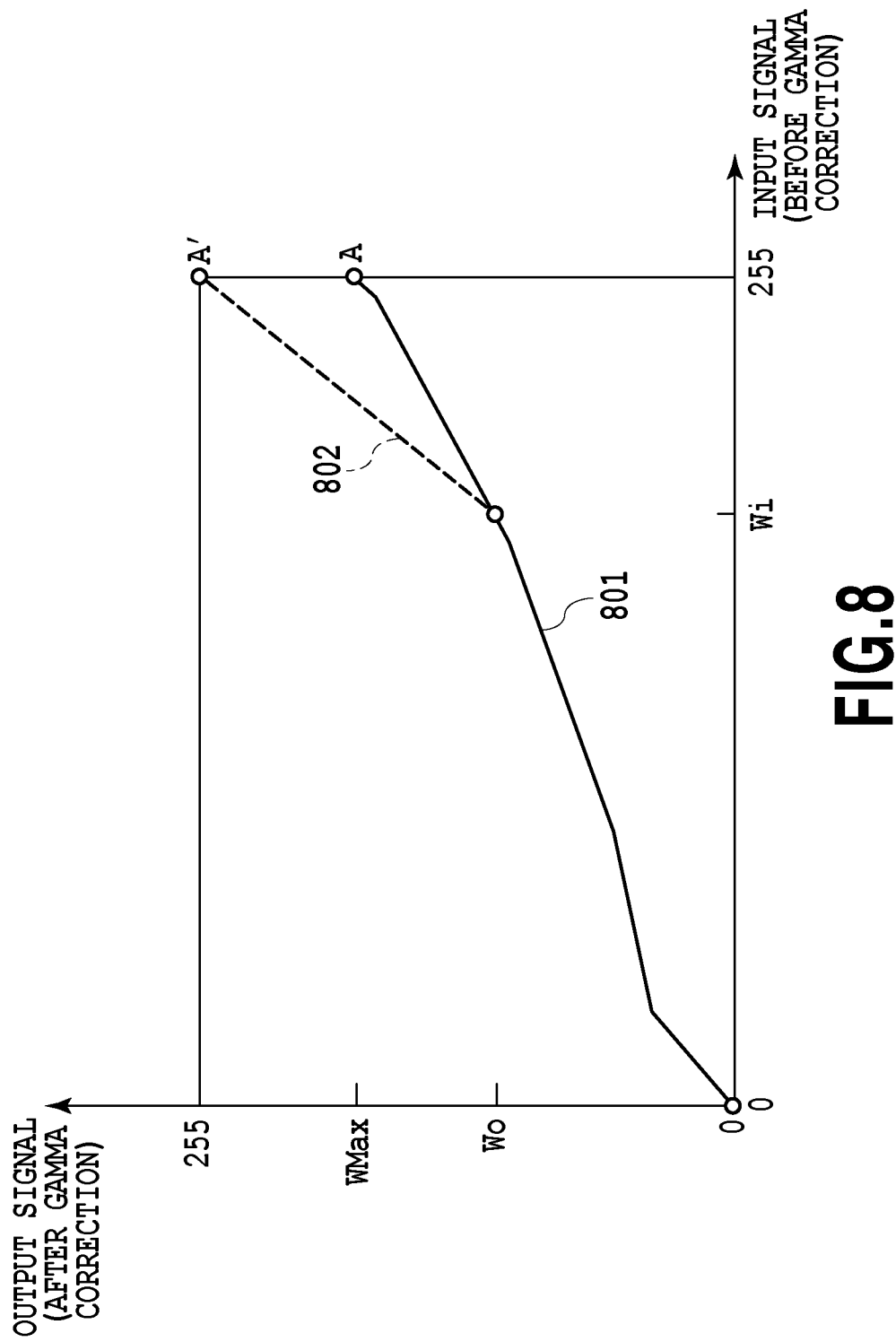
FIG. 8 is a diagram showing an example of a graph indicating the characteristics of a gamma correction LUT.

FIG. 8 is a graph indicating the characteristics of the gamma correction LUT that is created at step 505. The characteristics of the gamma correction LUT are characteristics opposite to the density characteristics (segment 701) obtained by measuring the patch sheet, i.e., are characteristics obtained by folding the segment 701 symmetrically with respect to the segment 702 indicating the target. However, in the gamma correction LUT (tone level correction table), the input value 255 before the gamma correction becomes a value (Wmax) smaller than 255 as the output value after the gamma correction. This means that in the case where the output value after gamma correction is set to 255 (in the case where solid black is output), the maximum density targeted at by the printing unit 112 is exceeded. Further, in the case where gamma correction with solid black as an input (input signal value is set to 255) is performed by using the gamma correction LUT, the output after gamma correction does not reach 255, and therefore, a dot loss may occur partially by the halftone processing (see the explanation in FIGS. 4Aa to 4Da and 4Ab to 4Db described previously). Because of this, in the case where there is a possibility of the occurrence of such a problem (Dmax>TDmax), the gamma correction LUT is modified at step 507, to be described later.

At step 506, the CPU determines whether the measured maximum density (Dmax) exceeds the target maximum density (TDmax). In the case where Dmax exceeds TDmax, the processing proceeds to step 507. On the other hand, in the case where Dmax does not exceed TDmax, the present processing is exited.

At step 507, the CPU performs terminal endpoint correction (in the example in FIG. 8, correction to raise a terminal endpoint A of a segment 801 indicating the characteristics of the gamma correction LUT to a point A') for the gamma correction LUT created at step 505. Due to this, it is guaranteed that the output value becomes 255 (the maximum tone level of the output signal) for the input value 255 (the maximum tone level of the input signal). Specifically, an LUT that has characteristics indicated by a line (a broken line 802 in FIG. 8) connecting linearly a point (Wi, Wo) of an output value Wo corresponding to an arbitrary input value Wi and the maximum value point (255, 255) of the input and output is created and used as a new gamma correction LUT. In this case, it is desirable that the position of the point (Wi, Wo) be as close as possible to the point (255, 255), but in the case where both the points are too close to each other, another problem of tone jump from the target tone level occurs, and therefore, the distance between both the points is determined by taking the balance into consideration. By correcting the terminal endpoint in this manner, it is made possible to correct the terminal endpoint while maintaining continuity in tone level although the gradation properties partially deviate from the target.

As described above, the terminal endpoint correction is performed only in the case where the measured maximum density (Dmax) exceeds the target maximum density (TDmax). Consequently, in FIG. 7, for example, in the case where the D7 does not exceed the target maximum density, the terminal endpoint correction is not performed and the gamma correction LUT is completed at the point of time of step 505.

The above is the contents of the updating processing of the gamma correction LUT. By performing tone level correction by using the gamma correction LUT for which the above-described terminal endpoint correction has been performed, it is possible to output any object as a solid black image, and therefore, it is possible to eliminate such trouble that, for example, part of dots of a line or a character are lost partially.

Then, the four kinds of gamma correction LUTs are created by performing the processing for each color of CMYK, and by using the four gamma correction LUTs in gamma correction, it is made possible to output a targeted tone level and color tone at all times by eliminating the variations in the state of the apparatus.

It is assumed that the created gamma correction LUT is saved in the storage unit 113 within the image processing apparatus and is used for the gamma correction processing until the contents thereof are updated. Further, in the case where the terminal endpoint correction has been performed, in addition to the gamma correction LUT (whose terminal endpoint is A') after the terminal endpoint correction, the gamma correction LUT (whose terminal endpoint is A) before the terminal endpoint correction is also saved because it is used to derive an LUT that is used for PWM control, to be described later.

Next, creation and updating of the one-dimensional LUT that is used for the PWM control are explained. The LUT that is used for the PWM control is created based on the LUT after the terminal endpoint correction and the LUT before the terminal endpoint correction that are saved in the processing to create the above-described gamma correction one-dimensional LUT. As described previously, in the gradation properties in the LUT after the terminal endpoint correction, partial tone jump from the target occurs (in the high-density area in which the input value is greater than Wi, a value of a high density higher than the target density is output). Because of this, an LUT for the PWM control in which the gain that is used at the time of PWM control is reduced in accordance with the degree of tone jump, the period of time during which one pixel emits light is reduced, and the amount of light is reduced is found. Due to this LUT, the amount of toner that attaches to the electrostatic latent image is reduced and it is possible to appropriately control the density in the high-density area.

Figure 9:
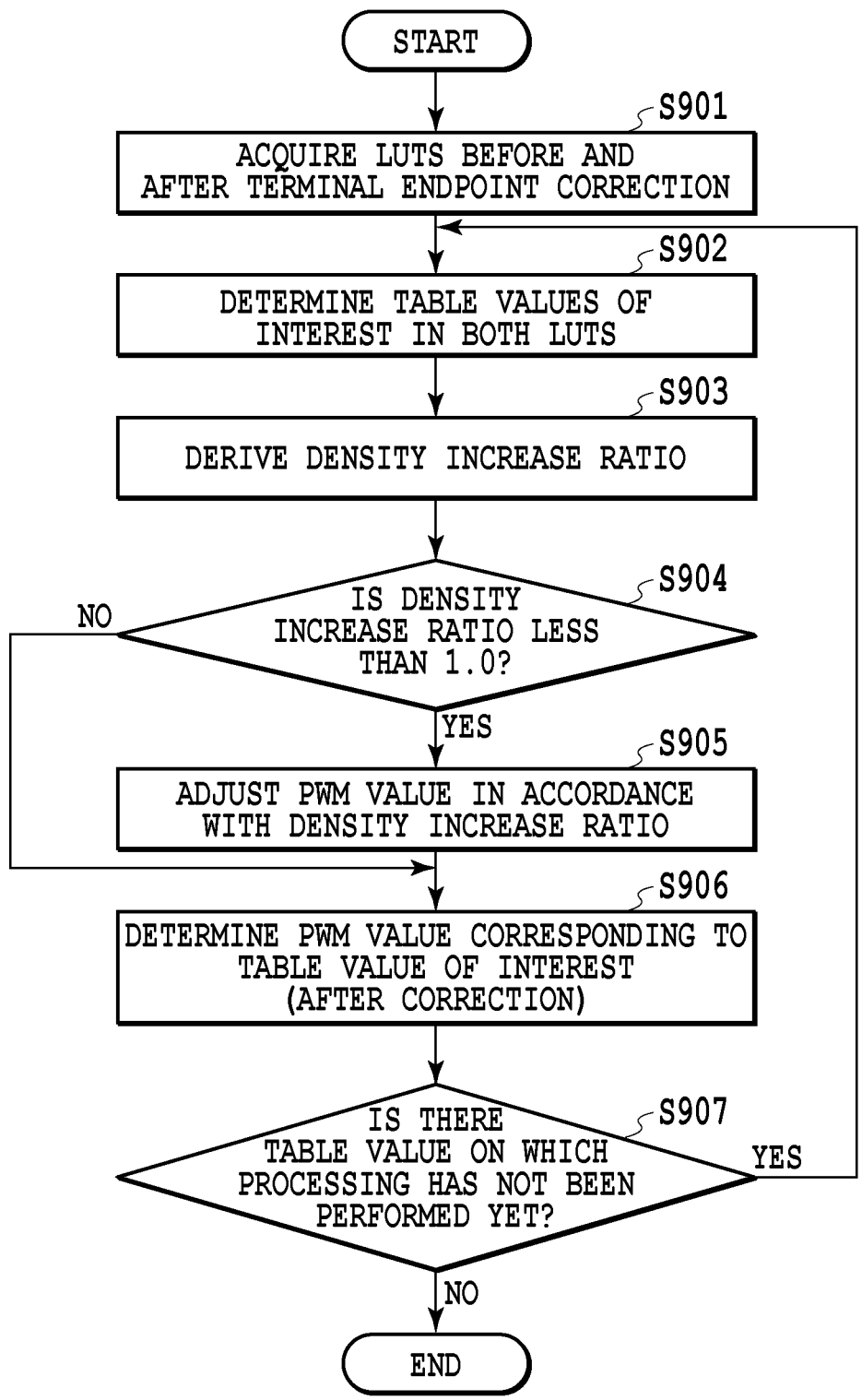
FIG. 9 is a flowchart showing a flow of updating processing of a PWM control LUT.

FIG. 9 is a flowchart showing a flow of updating processing of the PWM control LUT. The series of processing is also performed by the CPU reading computer executable programs in which the procedures shown below are described from the ROM onto the RAM and executing the programs.

At step 901, the CPU acquires the LUT before the terminal endpoint is corrected and the LUT after the terminal endpoint is corrected from the storage unit 113.

At step 902, the CPU determines a table value in the acquired LUT before the terminal endpoint correction and a table value in the acquired LUT after the terminal endpoint correction in a relationship of correspondence as table values to be focused on (hereinafter, a table value of interest), respectively.

At step 903, the CPU divides the table value of interest in the LUT before the terminal endpoint correction by the table value of interest in the LUT after the terminal endpoint correction and derives a ratio (density increase ratio) indicating an amount by which the density increases after the adjustment by the terminal endpoint correction.

At step 904, the CPU determines whether the density increase ratio derived at step 903 is less than 1.0. For a pixel whose derived density increase ratio is less than 1.0 (pixel whose density becomes high as the results of correcting the terminal endpoint), it is necessary to suppress the density by using the PWM control, and therefore, the processing proceeds to step 905. On the other hand, in the case where the derived density increase ratio is not less than 1.0, it is not necessary to suppress the density, and therefore, the processing proceeds to step 906.

At step 905, the CPU adjusts the PWM value in accordance with the density increase ratio derived at step 903. For example, in the case where the table value of interest that was 180 before the correction of the terminal endpoint increases to 200 by the terminal endpoint correction, it is predicted that for a pixel whose output value will be 200 as the result of the gamma correction, by multiplying the output density by 0.9, the target density is obtained. Consequently, for a pixel whose output value will be 200 after the gamma correction in the LUT used for the PWM control, 14 that is obtained by multiplying 15 by 0.9, which is equivalent to multiplying 15 by a gain of 0.9, is set as the PWM value. As described previously, in the case where the resolution of the PWM is 15 divisions, the light emitting time of the pixel becomes 14/15, and therefore, the density also become about 90% of the original density. By the processing such as this, the PWM value is adjusted, for example, as shown in Table 1 below.

TABLE 1

| Table value of interest (before terminal endpoint correction) | Table value of interest (after terminal endpoint correction) | Density increase ratio | PWM value |
|---|---|---|---|
| 180 | 200 | 0.90 | 14 |
| 190 | 220 | 0.86 | 13 |
| 200 | 230 | 0.87 | 13 |
| 210 | 255 | 0.82 | 12 |

At step 906, the CPU determines the PWM value corresponding to the table value of interest in the LUT after the terminal endpoint correction. In other words, in the case where the density increase ratio is less than 1.0, the PWM value after the adjustment at step 905, and in the case where the derived density increase ratio is 1.0, the PWM value that is not adjusted is determined to be the table value in the LUT for the PWM control.

At step 907, the CPU determines whether the PWM values have been determined for all the table values of interest in the acquired LUT before the terminal endpoint correction and the acquired LUT after the terminal endpoint correction. In the case where there is a table value (s) of interest for which the PWM value has not been determined yet, the processing returns to step 902 and the PWM value for the next table value of interest is determined. In the case where all the PWM values have been determined, the present processing is exited.

By the processing as above, it is possible to obtain the LUT for the PWM control in which the value after the terminal endpoint correction is taken to be an index and the PWM value is taken to be a table value. In the case of the present embodiment, by the LUT, in the vicinity of the terminal endpoint where the input value before the gamma correction is greater than Wi, the PWM value is less than 15 (gain less than 1.0) and on the contrary, in the area where the input value before the gamma correction is smaller than Wi, the PWM value is 15 (gain of 1.0). Further, in the LUT for the PWM control in the case of the gamma correction LUT in which the print density does not exceed the target density and for which the terminal endpoint correction is not performed, all the table vales (PWM values) will be 15 meaning a gain of 1.0.

The above is the contents of the updating processing of the PWM control LUT. Then, the above-described processing is performed at the timing at which the gamma correction LUT is updated so that the contents of updating of the gamma correction LUT are always fed back to the PWM control LUT. In other words, in the processing of calibration, the updating of the gamma correction LUT and the updating of the PWM control LUT are performed successively and the table values in both the LUTs are updated, respectively.

In the present embodiment, the example is explained in which the patch sheet is output at the time of the updating of the gamma correction LUT, the patch sheet is read by using a reader or a densitometer, and calibration is performed for all the density areas. However, the example is not limited to the aspect such as this, and it may also be possible to update the gamma correction LUT only for a specific density area by using a sensor within the apparatus.

Further, in the present embodiment, the gamma correction LUT and the PWM control LUT are updated for all the colors of CMYK, but it is also be possible to perform the updating only for a color(s) that will cause jaggies or discontinuity in a thin line in the case where the terminal endpoint correction processing is not performed. For example, it may also be possible to perform the updating only for black whose influence over the whole is small and whose influence of jaggies and discontinuity is great. In the case where the number of colors for which the updating is performed is limited to one among a plurality of color materials different in color, the amount of toner limitation value that is reduced thereby becomes small, and therefore, it is made possible to give priority to the gradation properties and color tone.

At the time of the creation of the gamma correction LUT, the patch sheet is output without performing the PWM control, but it may also be possible to create the gamma correction LUT by using a PWM control LUT prepared separately for outputting the patch sheet. In other words, it may also be possible to prepare in advance a dedicated PWM control LUT (hereinafter, an initial LUT) in which PWM values are adjusted in accordance with predicted characteristics of a printer engine (e.g., "15" is changed to "14"), and to output the patch sheet by using the initial LUT. By outputting the patch sheet using the initial LUT as initial color material amount correction data, it is possible to obtain a gamma correction LUT having characteristics whose tone jump from the target is small from the first, and therefore, it is possible to reduce the level (frequency and degree) of the terminal endpoint correction thereafter. In this case, it is necessary to note that the value that is used as a reference at step 905 of the updating processing of the PWM control LUT is the PWM value in the initial LUT prepared in advance. For example, in the case where the table value that was 190 before the terminal endpoint correction increases to 220 by the terminal endpoint correction, it is predicted that the target density is obtained by multiplying the output density by 0.86 for a pixel whose results of the gamma correction (output value) will be 220. Consequently, the PWM value, which is equivalent to multiplying a gain of 0.86, is set for the pixel whose output value will be 220 after the gamma correction in the PWM control LUT, but at this time, it is necessary to reflect the fact that "15" has been adjusted to "14" in the initial LUT. Specifically, in place of "15×0.86=13", "14×0.86=12" is found and this is set as the PWM value. In order to enable the processing such as this, in the case where the patch sheet is output by using the initial LUT, it is necessary to hold information on a difference for each table value in the initial LUT (information such as "1" in the case where "15" has been adjusted to "14"). Due to this, in the case where the patch sheet is output by performing the PWM control using the initial LUT prepared in advance, it is possible to generate a PWM control LUT that has taken into consideration the adjustment of the amount of laser light at the time of the outputting of the patch sheet.

In the present embodiment, as the unit configured to acquire the patch density at step 502, the image reading unit 111 (scanner) of the image processing apparatus is used, but a configuration in which the density value is acquired by another unit such as a densitometer may be accepted.

As above, according to the present embodiment, the table that is used for density control is divided into the gamma correction LUT that is used at the time of the gamma correction for multivalued image data and the PWM control LUT that is used at the time of the PWM control for binary image data on which halftone processing has been performed. Due to this, it is possible to prevent image quality from deteriorating, which is caused by the loss of part of dots constituting a line or a character, and at the same time, to perform tone level control without trouble such as toner scattering due to the outputting of a density higher than the supposed density.

As a result, it is made possible to output an image in solid black that should be output as an image in solid black while maintaining the optimum color reproduction and stability of tone level in any state of a printer, and to keep the density at that time also at the target density. Further, by following the target density, it is also made possible to predict the amount of toner to be consumed and the kind of toner to be consumed.

Further, the adjustment of the amount of toner (amount of charges in a latent image) that attaches to a latent image by the control of the amount of light of a laser element in the electrophotographic system can be said to correspond to the adjustment of the dot diameter by controlling the amount of ink to be ejected in the ink jet system. Because of this, in the case where the image printing system is the ink jet system, it is possible to obtain the same effect by performing the control of the amount of ink to be ejected in place of the control of the amount of light of a laser element described above. In other words, it is possible to appropriately control the density in an output image by generating an LUT (color material amount correction data) that is adjusted so that the amount of ink to be ejected becomes small in accordance with the degree of the adjustment in the tone level correction data and by controlling the dot diameter by adjusting the amount of ink to be ejected using the LUT.

Second Embodiment

The first embodiment is the aspect in which the gamma correction LUT for which the terminal endpoint correction has been performed is updated independently for all the colors of CMYK and in accordance with this, the PWM control LUT is updated, and the gamma correction and the PWM control in accordance therewith are performed for input image data.

However, in the case where the relationship between the light emission time, the amount of light, and the image density is not linear in the PWM control, even in the case where the light emission time is halved, the density is not halved as a result. In this case, the density in the density area exceeding Wi, the density will be a density different from the supposed density as a result. Consequently, it is desirable that the area for which terminal endpoint correction is performed be as mall as possible.

Here, in the case where CMYK overlap at the same coordinates within image data, even on a condition that the dots are lost partially, the loss is made up by another color, and therefore, the deterioration in image quality such as jaggies is unlikely to be conspicuous. By focusing on this point, an aspect in which whether terminal endpoint correction is performed or not performed is determined for each pixel is explained as a second embodiment.

Explanation of the portions in common to those of the first embodiment, such as the basic configuration of the image forming apparatus, is omitted or simplified, and in the following, different points are explained mainly.

Figure 10:
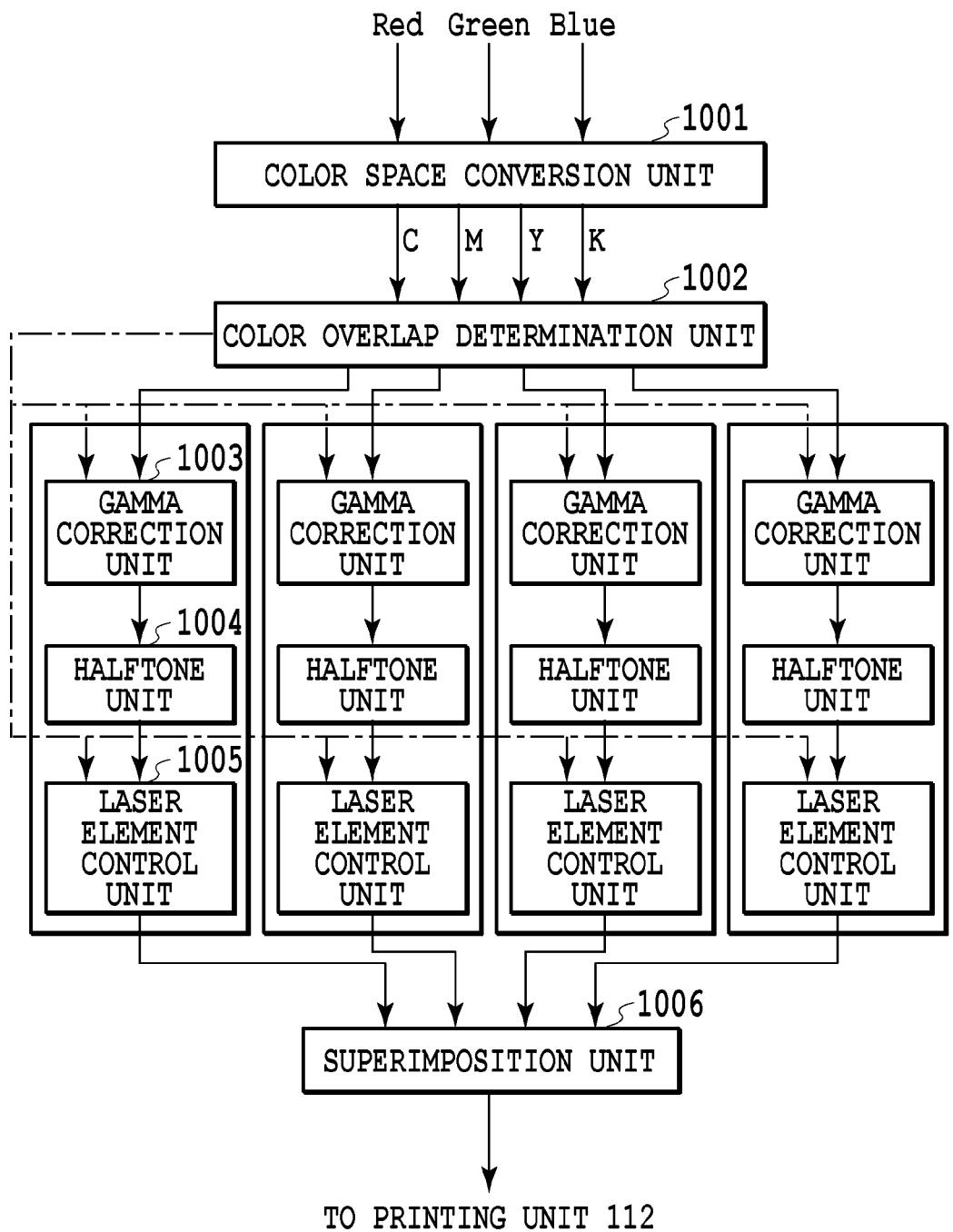
FIG. 10 is diagram explaining an outline of a flow according to a second embodiment until a CMYK image signal that is used in a printing unit is generated.

FIG. 10 is a diagram explaining an outline of a flow according to the present embodiment until a CMYK image signal that is used in the printing unit 112 is generated after the predetermined image processing is performed on an input RGB image signal. Multivalued image data that is represented by the RGB, which is input from the PC 120 etc. or acquired by the image reading unit 111, is sent to a color space conversion unit 1001.

The color space conversion unit 1001 converts the received RGB multivalued image data into the CMYK color space, which is the color space dependent on a printer device. The multivalued image data converted into each color space of YMCK is sent to a color overlap determination unit 1002.

The color overlap determination unit 1002 determines whether a color loss may occur based on the composition of each color of YMCK. As the determination method, there can be thought of a method of determining that a color loss may occur in the case of a pixel including only one color (e.g., a pixel whose values of CMY are 0 and which has only the value of Bk) because the loss cannot be made up by another color by referring to the density value of each color of YMCK. In the case of this method, for a pixel including two or more colors, the pixel is determined to be a pixel for which a color loss does not occur as a result because the loss can be made up by another color. Then, a determination signal indicating the results of the determination (e.g., in the case where a color loss may occur, a 1-bit signal indicating "1" and in other cases, a 1-bit signal indicating "0") is output to a gamma correction unit 1003 and a laser element control unit 1005 of each of YMCK.

The gamma correction unit 1003 performs processing to correct the tone level to the target tone level by performing gamma correction processing in accordance with each color of CMYK. In this case, the present embodiment differs from the first embodiment in that the LUT that is used is switched to another in accordance with the above-described determination signal. In other words, in the present embodiment, the LUT is switched between a first LUT for which terminal endpoint correction has been performed and a second LUT for which terminal endpoint correction has not been performed in accordance with the determination signal. These two LUTs are held in advance in the storage unit 113 and the LUT that is used is read in accordance with the determination signal (in the case where the determination signal is "1", the first LUT for which terminal endpoint correction has been performed is read and in the case where the determination signal is "0", the second LUT for which terminal endpoint correction has not been performed is read). The method of creating each gamma correction LUT is as explained in the first embodiment. The image data (8-bit multivalued data) on which the gamma correction processing has been performed is sent to a halftone unit 1004.

The halftone unit 1004 performs pseudo halftone processing on multivalued image data after the gamma correction processing. The binary image data after the halftone processing is sent to the laser element control unit 1005.

The laser element control unit 1005 performs PWM control processing based on the binary image data after the halftone processing. In the case where the resolution of the PWM used for modulation of the laser element is 16 tone levels, the data is converted into 4-bit data having a value of 0 to 15 per pixel as a result. This conversion is the same as that in the first embodiment in that the binary image data after the halftone processing is multiplied by a value converted from the multivalued image data after the gamma correction processing by using the one-dimensional LUT. The present embodiment differs from the first embodiment in that whether or not modulation is performed is switched in accordance with the determination signal. In other words, the present embodiment differs from the first embodiment in that whether or not the PWM control is performed is switched in association with the LUT that is used for the gamma correction processing. In the case where the PWM control is not performed, on a condition that the value of the image data after the halftone processing is "1", "15" corresponding to a multiplication factor of 1 is output and on a condition that the value of the image data is "0", "0" is output as a result.

A superimposition unit 1006 performs processing to superimpose images obtained for each of CMYK. Then, the image data on which the superimposition processing has been performed is sent to the printing unit 112 and output as a full color image in the printing unit 112.

As described above, in the case where each of CMYK has a value at the same coordinates (in the case where colors overlap), it can be expected that the loss of part of dots after the halftone processing is made up by another color. Because of this, it is not necessary to perform the gamma correction including the terminal endpoint correction and it is also not necessary to perform the PWM control. On the contrary, in the case where only one color has a value at the same coordinates (in the case where colors do not overlap), the portion where dots are lost becomes a white portion at the time of the lost of the color, and therefore, the portion can be visually recognized as jaggies. Because of this, it becomes necessary to perform the terminal endpoint correction at the time of gamma correction and at the same time, to perform the PWM control.

Further, the PWM control for each pixel does not necessarily have linearity for the density, and therefore, in many cases, the supposed density of the pixel is not obtained even by, for example, multiplication by a gain of 0.8. In this case, the tone level after the PWM control is unlikely to become a tone level targeted at in calibration. Because of this, the target tone level is implemented by performing gamma correction processing using the LUT for which the terminal endpoint correction has not been performed, without performing the PWM control.

By adopting the above-described configuration, it is made possible to selectively switch between the LUT that is used for gamma correction and the LUT that is used for the PWM control for each pixel, and therefore, the suppression of jaggies and the control of the tone level in accordance with the characteristics of an image are enabled.

The determination method in the color overlap determination unit 1002 is not limited to the example described above. Usually, it is rare for the portion required to have gradation properties such as a photo to include only one color and conversely, the portion that does not necessarily regard gradation properties as important, such as a line and a character, includes only one color (in particular, Bk monochrome) in many cases. Because of this, only by checking the density of each color of CMYK, it is possible to determine a color loss in a certain degree. Consequently, it may also be possible to determine an overlap of colors by using the balance of the density or the attribute of a character, a photo, etc. Due to this, it is made possible to suppress deterioration in image quality caused by a do less or jaggies as much as possible by performing the terminal endpoint correction for the pixel consisting of one color and to securely maintain the target tone level by means of the gamma correction for the pixel consisting of two or more colors.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-050306, filed Mar. 13, 2014 which is hereby incorporated by reference wherein in its entirety.

What is claimed is:

1. An apparatus used with a printing unit that prints a test pattern and with an image reading unit that reads the test pattern printed by the printing unit to produce tone level correction data used for bringing the reproduction characteristics of an image that is subsequently output by the printing unit close to a target value, comprising:
    an acquisition unit configured to acquire from the reading unit the tone level correction data;
    a conversion unit configured to convert the acquired tone level correction data into density data for the image subsequently output by the printing unit, wherein the density data includes density data corresponding to a maximum density value of the image;
    a first generate unit configured to generate adjusted tone level correction data obtained by adjusting the tone level correction data so that a predetermined density area of the image to be printed by the printing unit will increase in density in a case where the maximum density value of the image exceeds a target maximum density value of the image to be printed by the printing unit; and
    a second generate unit configured to generate color material amount correction data adjusted so that the amount of color material that is used for image formation by the printing unit decreases in the case where a first density value of the image corresponding to the tone level correction data is smaller than a second density value of the image corresponding to the adjusted tone level correction data, by using a density increase ratio of the first density value to the second density value.

2. The apparatus according to claim 1, wherein the tone level correction data and the color material amount correction data are each a lookup table in which output data corresponding to input data is stored.

3. The apparatus according to claim 1, wherein the printing unit is an electrophotographic image forming unit, and
    the color material amount correction data is data for controlling the amount of toner by controlling the amount of light of a laser element of the printing unit at the time of the formation of a latent image.

4. The apparatus according to claim 3, wherein the control of the amount of light is PWM control.

5. The apparatus according to claim 1, wherein the printing unit is an ink jet image forming unit, and the color material amount correction data is data for controlling the dot diameter by controlling the amount of ink to be ejected by the printing unit.

6. The apparatus according to claim 1, wherein the printing unit is a printing unit configured to form a color image by using a plurality of color materials in different colors, and
the tone level correction data and the color material amount correction data are generated for one color of the plurality of color materials.

7. The apparatus according to claim 1, wherein the test pattern is a test pattern that is output from the printing unit without making an adjustment to the amount of color material using the color material amount correction data.

8. The apparatus according to claim 1, wherein the test pattern is a test pattern that is output from the printing unit by making an adjustment to the amount of color material using initial color material amount correction data prepared in advance.

9. The apparatus according to claim 8, wherein in a case where the test pattern is a test pattern that is output by making an adjustment to the amount of color material using the initial color material amount correction data, the color material amount correction data that is generated is adjusted so that the amount of color material decreases by taking into consideration the adjustment at the time of outputting.

10. The apparatus according to claim 1,
wherein the conversion unit comprises:
a color space conversion unit configured to convert the color space of input multivalued image data input into the apparatus from the reading unit;
a gamma correction unit configured to perform gamma correction for the multivalued image data, the color space of which has been converted, by using the tone level correction data; and
a halftone processing unit configured to generate halftone image data by performing halftone processing on the multivalued image data for which gamma correction has been performed,
wherein the apparatus further comprises a unit configured to control the amount of color material that is used for image formation of halftone image data by the printing unit by using the color material amount correction data for the halftone image data on which halftone processing has been performed.

11. The image processing apparatus according to claim 10, wherein in a case where there is an overlap of a plurality of colors at the same coordinates within the multivalued image data, the gamma correction unit performs the gamma correction by using the tone level correction data before an adjustment is made so that the predetermined density area increases in density, in place of the adjusted tone level correction data that has been adjusted so that the predetermined density area increases in density.

12. The image processing apparatus according to claim 11, further comprising:
a color overlap determination unit configured to determine whether there is an overlap of a plurality of colors at the same coordinates within the multivalued image data and to generate a determination signal indicating the presence/absence of an overlap of colors, wherein
the gamma correction unit switches the tone level correction data that is used based on the determination signal.

13. The image processing apparatus according to claim 12, wherein the gamma correction unit switches between the use and the nonuse of the tone level correction data for each pixel in the multivalued image data.

14. The apparatus according to claim 1, wherein in a case where the density increase ratio is lower than 1.0, the second generate unit generates color material amount correction data, and in a case where the density increase ratio is not lower than 1.0, the second generate unit does not generate color material amount correction data.

15. A method for an apparatus used with a printing unit that prints a test pattern and with an image reading unit that reads the test pattern printed by the printing unit to produce tone level correction data used for bringing the reproduction characteristics of an image that is subsequently output by the printing unit close to a target value, comprising the steps of:
acquiring from the reading unit the tone level correction data;
converting the acquired tone level correction data into density data for the image subsequently output by the printing unit, wherein the density data includes density data corresponding to a maximum density value of the image;
generating adjusted tone level correction data obtained by adjusting the tone level correction data so that a predetermined density area of the image to be printed by the printing unit will increase in density in a case where the maximum density value of the image exceeds a target maximum density value of the image to be printed by the printing unit; and
generating color material amount correction data adjusted so that the amount of color material that is used for image formation by the printing unit decreases in the case where a first density value of the image corresponding to the tone level correction data is smaller than a second density value of the image corresponding to the adjustment in the adjusted tone level correction data, by using a density increase ratio of the first density value to the second density value.

16. A non-transitory computer readable storage medium storing a program for causing a computer to perform a method for an apparatus used with a printing unit that prints a test pattern and with an image reading unit that reads the test pattern printed by the printing unit to produce tone level correction data used for bringing the reproduction characteristics of an image that is subsequently output by the printing unit close to a target value, comprising the steps of:
acquiring from the reading unit the tone level correction data;
converting the acquired tone level correction data into density data for the image subsequently output by the printing unit, wherein the density data includes density data corresponding to a maximum density value of the image;
generating adjusted tone level correction data obtained by adjusting tone level correction data so that a predetermined density area of the image to be printed by the printing unit will increase in density in a case where the maximum density value of the image exceeds a target maximum density value of the image to be printed by the printing unit; and
generating color material amount correction data so that the amount of color material that is used for image formation by the printing unit decreases in the case where a first density value of the image corresponding to the tone level correction data is smaller than a second density value of the image corresponding to the adjusted tone level correction data, by using a density increase ratio of the first density value to the second density value.

17. An image forming apparatus comprising:
a printing unit configured to form an image by the electrophotographic system and a test pattern;

a reading unit that reads the test pattern printed by the printing unit to produce first tone level correction data that is data for bringing the reproduction characteristics of an image output by the printing unit close to a target value;

a first acquisition unit configured to acquire, from the reading unit, based on the results of reading the test pattern output by the printing unit, the first tone level correction data;

a conversion unit configured to convert the acquired first tone level correction data into density data for the image subsequently output by the printing unit, wherein the density data includes density data corresponding to a maximum density value of the image;

a second acquisition unit configured to acquire second tone level correction data obtained by adjusting the first tone level correction data so that a predetermined density area of the image to be printed by the printing unit will increase in density in a case where the maximum density value of the image exceeds a target maximum density value of the image to be printed by the printing unit; and a control unit configured to generate correction data so that the amount of light of a laser element that is used for image formation by the printing unit decreases in the case where a first density value of the image corresponding to the first tone level correction data is smaller than a second density value of the image corresponding to the second tone level correction data, by using a density increase ratio of the first density value to the second density value.

* * * * *